United States Patent [19]

Behl et al.

[11] Patent Number: 5,688,315

[45] Date of Patent: Nov. 18, 1997

[54] COLORED TITANIFEROUS COATING PIGMENT OBTAINED AS A FLOCCULATED BY-PRODUCT IN A KAOLIN PURIFICATION PROCESS

[75] Inventors: Sanjay Behl; Mitchell J. Willis; Raymond H. Young, all of Macon, Ga.

[73] Assignee: Engelhard Corporation, Iselin, N.J.

[21] Appl. No.: 688,571

[22] Filed: Jul. 31, 1996

Related U.S. Application Data

[62] Division of Ser. No. 404,772, Mar. 15, 1995, Pat. No. 5,584,394.

[51] Int. Cl.$^6$ .................................. C09C 1/36; C09C 1/42
[52] U.S. Cl. ..................... 106/446; 106/442; 106/439; 106/416; 106/486; 106/487; 501/148; 162/181.1; 162/181.8; 524/447
[58] Field of Search .................................. 106/486, 487, 106/442, 446, 416, 439; 501/148; 209/5; 524/447; 162/181.1, 181.8, 183

[56] References Cited

U.S. PATENT DOCUMENTS

| | | | |
|---|---|---|---|
| 3,670,883 | 6/1972 | Weir | 209/5 |
| 3,701,417 | 10/1972 | Mercade | 209/5 |
| 3,826,365 | 7/1974 | Mercade | 209/5 |
| 3,837,482 | 9/1974 | Sheridon, III | 209/5 |
| 3,857,781 | 12/1974 | Maynard | 209/5 |
| 3,862,027 | 1/1975 | Mercade | 209/5 |
| 4,014,709 | 3/1977 | Dykstra et al. | 106/300 |
| 4,334,985 | 6/1982 | Turner, Jr. | 501/148 |
| 5,047,375 | 9/1991 | Dunaway et al. | 106/439 |
| 5,154,767 | 10/1992 | Kunkle et al. | 106/439 |
| 5,190,615 | 3/1993 | Kunkle et al. | 162/135 |

FOREIGN PATENT DOCUMENTS

WO 96/17688  6/1996  WIPO ................ B03D 3/06

*Primary Examiner*—Michael Marcheschi
*Attorney, Agent, or Firm*—I. L. Moselle; T. J. Shatynski

[57] ABSTRACT

Described is a process for separating a mixture of finely divided minerals into constituents thereof. In particular, the invention relates to a procedure for effecting such separation by a novel selective flocculation technique wherein a dispersed aqueous pulp containing the mixture of minerals is preconditioned for selective flocculation with an anionic polymer by addition of both a fatty acid such as oleic acid and source of polyvalent cation such as calcium chloride. The fatty acid and cation of the salt selectively coat the component of the mixture that is subsequently flocculated with the anionic polymer. A polyacrylate salt dispersant is preferably used in the process. The invention is especially adapted to the separation of colored titaniferous impurities from kaolin clay in which case both a white purified kaolin product and a strongly flocculated dun-colored titania/kaolin mixture are recovered and then dispersed producing a material useful as a paper coating pigment.

7 Claims, No Drawings

COLORED TITANIFEROUS COATING PIGMENT OBTAINED AS A FLOCCULATED BY-PRODUCT IN A KAOLIN PURIFICATION PROCESS

RELATED APPLICATION

This application is a divisional of U.S. Ser. No. 08/404,772, filed Mar. 15, 1995, now U.S. Pat. No. 5,584,394.

FIELD OF THE INVENTION

U.S. Pat. No. 5,535,890 describes a novel process for purifying kaolin clay containing a colored titaniferous impurity which involves selective flocculation of the colored impurity as a dense gelatinous lower layer and recovery of a purified kaolin product useful as paper coating pigment. The reagents used include fatty acid, divalent metal salt, high molecular weight anionic polymer and controlled use of anionic dispersant. In practice of the instant invention, the dun-colored gelatinous layer is processed to produce a valuable pigment also useful as a coating pigment by the paper industry.

BACKGROUND OF THE INVENTION

U.S. Pat. No. 5,535,890 describes a novel process for separating mixtures of finely divided solids which represents a significant departure from known froth flotation and selective flocculation processes. The process overcomes many of the deficiencies of prior art froth flotation and selective flocculation separation processes and provides means for producing novel kaolin pigment products when applied to kaolin clay.

The procedure utilizes selective flocculation of constituents in a previously dispersed aqueous mineral pulp, preferably a pulp dispersed with sodium metasilicate and sodium polyacrylate. The pulp is dispersed in the sense that the particles are not aggregated with each other. The dispersed pulp is preconditioned for subsequent selective flocculation by the addition of both a fatty acid and a water soluble source of a polyvalent metal cation. The quantities of fatty acid and polyvalent metal cation are insufficient to flocculate components in the dispersed pulp. When anionic polymer is added to the preconditioned dispersed pulp, a dense flocculated phase forms virtually instantaneously and settles rapidly as a dense, viscous, gelatinous bottom layer; the top layer is a dispersed fluid pulp containing the non-flocculated mineral particles. The flocculated phase also contains virtually all of the fatty acid and polyvalent cations introduced into the pulp. Separation of the lower dense gelatinous layer from the remainder of the pulp is readily accomplished by decantation or other conventional unit operation.

In the process the pulp is not subjected to froth flotation after introduction of fatty acid and polymer; nor is froth flotation used to accomplish the separation of the lower flocculated phase from the upper dispersed phase.

In an especially preferred embodiment, the invention is practiced with impure kaolin clay containing discrete particles of at least one colored titaniferous impurity and the kaolin and the impurities are so fine that they do not respond satisfactorily to conventional froth flotation processes such as ULTRAFLOTATION or TREP. The dispersant used in purifying such kaolins in accordance with the invention is preferably sodium metasilicate supplemented with sodium polyacrylate. Examples of such ultrafine kaolins are those mined in East Georgia, U.S.A. These clays have an average particles size below 0.5 micron and are presently beneficiated by selective flocculation using a weakly anionic polymer, followed by addition of copious quantities of salt to facilitate sedimentation of the flocs and multiple washing steps.

The invention described in U.S. Pat. No. 5,535,890 constitutes a significant breakthrough in the beneficiation of a host of very finely divided mineral mixtures that can provide a significant economic benefit over presently practiced technologies. For example, high brightness kaolin products (90% GE brightness and higher) can be produced without froth flotation. In some cases the high brightness kaolin products can be produced without conventional post processing procedures intended to increase brightness, such as, for example, bleaching and magnetic separation. This is explained by the fact that the process can achieve such a significant reduction in the quantity of colored impurities that conventional downstream beneficiation operations may not be needed to produce kaolin products of desired brightness. In some cases, preliminary degritting (necessary in most kaolin beneficiation schemes) can be omitted because the grit can be removed in the settled flocculated impurity layer. The process does not introduce the undesirable soluble salts introduced during prior art selective flocculation processes. This can provide significant cost reduction in kaolin processing because multiple washing steps are not needed. In fact, the multivalent metal cations present in the kaolin crude or introduced during processing may be picked up substantially quantitatively in the flocculated layer, thus not impairing the rheology of the purified kaolin. Beneficiated kaolin products having remarkably good rheology can be produced.

There is a long history of efforts devoted to the production of low brightness pigments from waste streams obtained by purifying kaolin clay by means such as magnetic purification or froth flotation. Nonlimiting examples of patents relating to this aspect of clay beneficiation include:

| U.S. Pat. No. 5,190,615 | Low Brightness Functional Pigment from Process By-Product | Kunkle, et al. |
| --- | --- | --- |
| U.S. Pat. No. 4,014,709 | Opacifying Pigments and Methods for Making Same | Dykstra, et al. |
| U.S. Pat. No. 5,047,375 | Method for Producing High Opacifying Kaolin Pigment | Dunaway, et al. |
| U.S. Pat. No. 5,154,767 | Low Brightness Functional Pigment from Process By-Product | Kunkle, et al. |

The major problem with by products from either magnet rejects or froth flotation wastes is the high viscosity (poor fluidity) of the materials. Fluidity is defined herein as % solids where the Brookfield viscosity is 500 cps or below @ 20 rpm using No. 2 spindle. For example, pigment products that form slurries having a maximum of 65% solids have poorer fluidity than products that can form 70% solids slurries having such a viscosity measurement. In the case of magnet rejects, the solids at which the rejects are recovered are very low, typically in the range of 3–10% by weight. It is not economical to process such dilute streams unless costly chemicals are added for dewatering purposes.

SUMMARY OF THE INVENTION

An unexpected benefit of the selective flocculating process of said copending patent application, when applied to ultrafine kaolins such as the East Georgia kaolins described above, is that the by-product dun-colored titania flocculated concentrate can be redispersed to produce pigments having a spectrum of desirable products. It was unexpected that the titaniferous flocced layer obtained as a by-product when using East Georgia kaolin as feed to the selective flocculation process could be redispersed and it was fortuitous that the resulting dispersed dun-colored pigment possessed properties considered desirable by the paper coating industry. In particular, the excellent rheology of the redispersed by-product was valuable and unexpected. Normally, a flocculated material such as the by-product would be so strongly flocculated as a result of the use of a highly anionic polymer that it would not be predictable that such material could be dispersed sufficiently for use as a coating pigment by the paper industry. It was not predictable that the resulting pigments would have desirable rheological characteristics.

Coating pigments obtained by dispersing the flocculated by-product contain about 5–25% by weight $TiO_2$, the balance being predominately, e.g., 75 to 95 weight %, kaolin booklets. The size of the pigment (average) is 0.30 to 1.0 micrometers usually 0.45 to 1.25 micrometers; 60–80% by weight is finer than 2 micrometers. Brookfield viscosity (20 rpm No. 2 spindle) is 150–500 cps at 70% solids. Hercules viscosity (at 4400 rpm with "A" bob) is 4–15 dyne at 70% solids.

Coating pigments obtained by dispersing and then delaminating the flocculated by-product have the following characteristics: Average size—0.3 to 1.0 micrometers and 85% by weight or greater is finer than 2 micrometers. Brookfield viscosity @ 20 rpm, No. 2 spindle is 150–500 cps at 70% solids. Hercules viscosity at 4400 rpm with A bob is 4–15 dyne at 70% solids.

DESCRIPTION OF PREFERRED EMBODIMENTS

The invention will be described in detail for processing an impure ultrafine kaolin crude from East Georgia, U.S.A. and recovering both purified kaolin and a valuable by-product. Colored impurities in the crude are predominantly titania (both rutile and anatase). It is likely that some crudes may contain anatase or rutile as the sole titania mineral. Typical titania ($TiO_2$) analysis are in the range of 2.0 to 4.5% by weight, based on the dryweight of the degritted clay as mined. Acceptable improvements in brightness have been achieved with East Georgia clay crudes in which $TiO_2$ analyzed as low as 0.6% to as high as 6.0%. A portion of the iron typically is located in the structural lattice of the kaolin crystals. Iron is present in minor amount, e.g., up to 1.0% $Fe_2O_3$ based on the dry weight of the degritted clay. These clays may have poor response to oxidative and reductive bleaches and do not respond satisfactorily to known flotation schemes.

The particle size of typical East Georgia crude clays varies from 80% finer than 2 micron to in excess of 95% finer than 2 micron e.s.d. (equivalent spherical diameter). At least 50% by weight is generally finer than 0.4 micron e.s.d. Thus, these clays fall within a common definition of slimed ores, as used in froth flotation technology. The East Georgia clays are becoming of increasing importance to the paper industry due to excellent high shear rheology and as a compatible co-pigment with carbonates. Removal of titania impurities improves the brightness and the shade (less yellow) of the clay, resulting in a more compatible carbonate co-pigment.

The primary dispersant presently preferred in practice of the selective flocculation step is sodium metasilicate. It was found that compositions obtained made by mixing sodium hydroxide with sodium silicate solutions such as N® Brand sodium silicate to the same $Na_2O/SiO_2$ ratio as sodium metasilicate do not result in as extensive $TiO_2$ removal from East Georgia kaolins as can be achieved using sodium metasilicate.

The sodium metasilicate primary dispersant can be added dry or as a solution in water. When added as a solution, the concentration of the metasilicate is not important. The primary dispersant is added to a clay slurry of 5 percent to 70 percent solids, preferably above 50% solids, using 3 to 9 pounds per ton, preferably above 6 pounds per ton, sodium metasilicate, dryweight based on the dry clay weight. Sodium metasilicate, in excess amounts, will tend to coagulate the suspension; this has an adverse effect on the selective flocculation process. When added in insufficient amount, the slurry will not be dispersed; this adversely affects the selective adsorption of the flocculating agent.

A water soluble dispersant grade of sodium or ammonium polyacrylate such as C211 sodium polyacrylate, is advantageously added to the pulp previously dispersed with sodium metasilicate, using 0.1 to 0.8 pounds per ton, based on the dry weight of the clay, in order to assure dispersion of the clay throughout processing. Typical molecular weights of polyacylate dispersants can range between 2,000 to 20,000. The acrylate dispersant is essential for achieving high recovery of purified clay. Recommended viscosity of an adequately dispersed slurry for purposes of this invention is less than 600 cps at 20 rpm, as measured by a No. 2 spindle with a Brookfield viscometer. The pH of a kaolin pulp prior to addition of sodium metasilicate is usually in the range of 5 to 7. After addition of sodium metasilicate, the pH is usually in the range of 7 to 11; sodium or ammonium polyacrylate usually has no effect on the pH of the slurry.

After addition of primary dispersant and acrylate salt (secondary dispersant), the dispersed kaolin pulp is a thin fluid having the appearance of a milkshake. When maintained quiescent, essentially no stratification or appearance of flocs takes place. As mentioned, the slurry is dispersed in the sense that particles are not aggregated. The degree of dispersion may not be the same as that of a slurry dispersed to minimum viscosity (i.e., a rheologically dispersed slurry).

Fatty acids used in the process to precondition the impure clay for selective flocculation can be of the type conventionally used in oxide mineral froth flotation, for example, C12–18 fatty acids. Oleic acid is presently preferred. Mixtures of fatty and resin acids such as tall oil fatty acids and sulfonated fatty acids can be used. The amount of fatty acid will vary with the content of impurities in the kaolin and is typically in the range of 1 to 10 pounds, most usually 3 to 5 pounds per ton based on the dry clay weight. When too much fatty acid is used, a film (or a separate phase) is observed on the surface of the slurry; this film entraps fine colored aggregates, preventing them from settling after flocculation; when an insufficient amount of fatty acid is used, the separation efficiency of the process is poorer. Addition of frothers is not advantageous.

A salt containing a polyvalent metal cation is added to the pulp simultaneously with or before the addition of the fatty acid. When treating a kaolin crude, pre-concentrate or a concentrate of a kaolin crude containing a solid which provides polyvalent cations in pulp, it may not be necessary to add any other source of polyvalent cations. Suitable salts containing polyvalent metal cations are soluble in water at the pH of the pulp to which the salt is added. Especially preferred are salts containing divalent colorless metal cations, particularly calcium, magnesium and barium. The anion of the salt is preferably chloride, although nitrate, sulfate, acetate or formate salts may be used. The salt is added dry or as an aqueous solution; salt is added in the amount generally in the range of about 0 to 4 pounds/ton, most preferably about 2 pounds per ton of dry clay. When excess salt is used, undesired nonselective flocculation of the pulp may occur and this may interfere with the ability of the polymer to flocculate the titania selectively. Also excess salt (relative to fatty acid) may necessitate one or more washing steps which can add significantly to the cost of the processing. When no salt is added, the flocs formed are very small and this would adversely affect the separation process.

In laboratory experimentation simple propeller mixers can be employed during all stages of the processing. Batch or continuous operations may be used. In continuous operations, a squirrel cage mixer can be employed to mix the dispersed pulp after addition of fatty acid and salt.

The flocculating agent used in the process is highly anionic and is a homopolymer or co-polymer of carboxylic acid, carboxylic anhydride and carboxylic acid salt monomer with a suitable non-ionic monomer. Examples of a non-ionic monomers are carboxylic acid amide and carboxyl alkyl esters. A co-polymer of acrylic acid (or salt thereof) and acrylamide is preferred for kaolin processing. Since the polymer is highly anionic, it consists predominately of the acid acrylic group.

A flocculating agent used successfully in the process is a highly anionic, high molecular weight copolymer of sodium acrylate and acrylamide having greater than 50% (by weight) acrylate and a molecular weight in excess of 5 million. The preferred polymer has 95% or greater acrylate (by weight) in the co-polymer and a molecular weight in the range of 10–30 million, with 25 million preferred. Polymers used in the accompanying examples were obtained from Sharpe Specialty Chemical Co. and included Sharpfloc™ 9990, 9993, 9950, 9954 and 8581 Polymers. The method of production of these polymers is proprietary. In theory they can be prepared by either co-polymerization of acrylamide and acrylic acid (anionic monomer) or by partial hydrolysis of polyacrylamide.

Fatty acid and salt are usually added to a previously dispersed pulp at 10 to 50 percent solids. Minimal dilution occurs when these reagents are added, whereby the solids of the pulp remain essentially unchanged. The pH of the slurry typically ranges from 6.5 to 10 after addition of fatty acid and salt.

The solids of the pulp after addition of fatty acid and salt is generally in the range of 20 to 45%, with about 40% preferred. It is desirable to dilute the pulp with water, preferably water having a low mineral content, after addition of fatty acid and salt but prior to addition of the polymer.

The polymer is added as a solution having a concentration (weight) less than 0.5%. At higher concentration, the flocculated material may aggregate due to mixing limitations. At very low concentrations, the volume of water added becomes too large, thereby causing handling problems. In making up the polymer solution, water with a low content of calcium and magnesium must be used. Agitation should be sufficiently moderate to avoid degradation of the polymer while it is being solubilize in water.

Virtually immediately after the polymer solution is added to the well dispersed pulp preconditioned with fatty acid and metal salt, the formation of flocs can be observed. It is not necessary to agitate the contents of the vessel in order for floc to form. However, agitation, even severe, will not impair floc formation. Within a few minutes of standing under quiescent or semi-quiescent conditions, the floc settles as a well-defined viscous gelatinous bottom layer which contains predominantly all of the titaniferous minerals in the starting clay. In case of East Georgia kaolin, the iron content of the clay remains essentially unchanged. However, in the case of kaolins containing liberated iron mineral, the iron should concentrate in the flocs. Unless the clay has been degritted before treatment, grit will report in the flocced layer when processing kaolin crude. The lower settled layer is generally dun colored and is distinctly darker than the dispersed upper layer which contains the purified clay. Most of the water in the pulp appears in the supernatant clay-rich upper layer.

After polymer addition, a fluid dispersion of beneficiated kaolin product can be decanted in a cylindrical tank, column, etc., with the underflow containing the gelatinous mass containing coarse particles greater than 5 micron, impurities including color bodies, and other minerals. Mechanical devices such as a drag box or a low shear centrifugal device, may also be used to separate the gelatinous flocs from the dispersed product.

The flocs at 25–45% solids have a very high viscosity (in excess of 2000 cps @ 20 rpm). Experts in the field, based on the morphology of the crude and the nature of chemicals (salt, fatty acid and a flocculant) present in the flocced mass, would expect this material to have low fluidity or poor viscosity. Since a very strong flocculating agent is used in the system, the flocced mass would also be expected to have a very poor re-dispersability.

The material in the gelled mass is primarily kaolin (between about 70–95% by weight), the rest being $TiO_2$ (between about 5–25% by weight) and $Fe_2O_3$ (between about 0.5–2% by weight). A substantial proportion of the kaolin is in the form of booklets. The $TiO_2$ is in the form of rutile, anatase or a mixture thereof. Calcium chloride, oleic acid and the polymer concentrate in the gelled mass by a factor of 2 to 3 as compared to the dosage of these reagents originally added to the system, thus, a typical concentration of these reagents (total) is less 0.5% based on the dry weight of the gelled mass.

In practice of this invention, the flocced material can completely be redispersed by using a standard kaolin clay dispersant such as C211 sodium polyacrylate, sodium metasilicate, sodium silicate, sodium hexametaphosphate or combinations thereof. This dispersed slurry must then be degritted, for example, by passing through a 325 mesh screen (U.S. Standard). This is required because grit cannot be tolerated in a paper coating application. If used in a filling or wet end application, such a degritting step may not be necessary. The slurry, after degritting, has an excellent viscosity. Brookfield viscosity @ 70% solids using No. 2 spindle is usually in the range of 100–500 cps and the Hercules viscosity @ 70% solids using the A bob is between 6–25 dyne at 4400 rpm. The particle size is typically 65%–80% finer than 2 micrometers, with an average particle size in the range of 0.45 to 1.25 micrometers. The resulting material usually has a brightness in the range of 70–80%. It was found that the particle size distribution of the by-product is a function of the dosage of acrylate dispersant used in the process.

The flocculated layer containing the concentrate of titania typically has a solids content below 40% by weight, e.g., 20–30% by weight. These solids are too low for economical shipment. Conventionally, pigments are supplied as a spray dried solid or a high solids, for example 70% solids, dispersed aqueous slurry. To increase solids, the redispersed flocculated by-product is acidified to facilitate partial dewatering by filtration or decantation. The partially dewatered solids are washed and then redispersed and either spray dried or formed into a high solids slurry by adding an appropriate amount of spray dried pigment to washed partially dewatered pigment. See the illustrative examples.

The degritting step may be followed by a step to delaminate the kaolin booklets using a standard delamination media such as, for example, styrene beads or glass. Other delamination media can be employed. The delamination delta at 2 micrometers for the product should be in excess of 5 points to achieve peeling of the booklets. The term "delta" refers to the change of particle size at a set values, in this case, 2 micrometers. Delamination may be followed by conventional bleach, flocculation and washing.

The material, when delaminated to 85% by weight or greater than 2 micrometers, has an excellent viscosity (Brookfield @ 70% solids in the range of 100–500 cps @ 20 rpm using a No. 2 spindle and a Hercules viscosity @ 70% solids of 9–20 dyne at 4400 rpm using A bob). Conventional wisdom would lead one to expect that delamination would negatively impact viscosity, especially high shear viscosity. However, this does not occur when the by-product obtained from an East Georgia kaolin is delaminated. In this case, the viscosity remains unchanged. However, when the selective flocculation process is applied to a conventional soft kaolin, which is much coarser than an East Georgia crude, the viscosity of the by-product is adversely affected by delamination. The slurry of redispersed delaminated by-product pigment can be acidified, filtered, washed and used as spray dryer feed or to product a high solids slurry as described above.

Undelaminated titania pigments obtained as by-products from redispersed flocs are recommended for use as a pigment in base coats of recycled boards. The beneficial properties may in part be due to the higher scattering ability of the pigment because of the $TiO_2$ content and also because of the yellow shade. The delaminated form of the pigment is primarily intended for use as a light weight coating (LWC) pigment in a case where low brightness sheet may be required. The exceptionally good viscosity at high solids of both the delaminated and nondelaminated forms in the pigment is advantageous because it affects the runability of the pigment.

The following examples are given to illustrate the invention in presently preferred best mode operation and are not to be construed as limiting the invention thereto. In these examples, the kaolin crudes employed were from a mine in East Georgia, U.S.A. The typical particle size distribution was 80% (weight) finer than 2 microns with average particle size being 0.3 to 0.4 microns.

All quantities are reported on a dryweight basis unless otherwise indicated. All mesh sizes refer to values obtained using U.S. Sieves.

EXAMPLE 1

This example illustrates the production of purified kaolin from an East Georgia kaolin crude. The crude was blunged at 60% solids with 7 lb/ton of anhydrous sodium metasilicate and 0.6 lb/ton of C211 (sodium polyacrylate) using a Cowles mixer. This slurry was mixed for 15 minutes to ensure complete makedown of the crude clay. This slurry was screened through a 325 mesh screen to remove the coarse grit material. The resulting slurry was then diluted to 40% solids. The pH of the slurry was 10.4. To this slurry 5 lb/ton of oleic acid and 2 lb/ton of calcium chloride solution (38.5%) were added simultaneously while mixing the slurry. The resulting slurry was mixed thoroughly at ambient temperatures for 15 minutes. To this slurry 0.25 lb/ton of Sharpfloc™ 9950 polymer was added under mild agitation. Sharpfloc™ 9950 is a co-polymer of polyacrylamide and polyacrylate with 95% anionic charge and molecular weight in excess of 10 million. The required amount of polymer was diluted to a concentration such that when added to the clay slurry the resulting solids loading was 20%. Colored flocs began to appear immediately. As soon as agitation was stopped the flocs began to settle very rapidly. The flocs were settled for 30 minutes. The floc phase (dun colored gelatinous phase) constituted about 30% of the volume of the slurry. The dispersed slurry was decanted to separate it from the flocced layer and passed through a 325 mesh screen to remove any small flocs still remaining with the slurry of purified kaolin. The solids content of the decanted slurry was 10%. The slurry was then flocced, using alum and sulfuric acid, and filtered in a Buchner funnel. The filter cake was dried in a microwave oven.

The results, reported in Table 1, show that the $TiO_2$ level of the East Georgia kaolin was reduced from about 4% to about 0.6%. The GE brightness improved from 80.0% to 90.4% at an outstanding clay recovery of 73%.

EXAMPLE 2

This example also illustrates the production of purified kaolin from an East Georgia kaolin crude. A portion of the dispersed slurry used in Example 1 was conditioned with oleic acid and calcium chloride as in Example 1. This slurry was aged for 12 hours. The slurry was then diluted to 20% solids and thereafter 0.25 lb/ton of Sharpfloc™ polymer 9950 at 0.01% (weight concentration) was added under mild agitation. Colored flocs begin to appear and, once the agitation was stopped, the flocs settled very rapidly. The flocs were settled for 30 minutes and they formed a lower layer constituting about 30% volume of the slurry. The dispersed slurry was decanted and passed through a 325 mesh screen to remove any small flocs still remaining with the purified slurry. The product had GE brightness of 89.0%. Recovery of kaolin in the process was 82%.

EXAMPLE 2A

The purified slurry of Example 2 was treated with 5 lb/ton of reduction bleach (sodium dithionite), flocced with 6 lb/ton of alum and sulfuric acid (pH 3.5) and filtered. These steps were carried out to determine if the clay could be further brightened by conventional reductive bleaching. The bleached sample was dried and the results reported in Table 1. Data in table show that the GE Brightness of the bleached beneficiated product was 89.9%. This indicates that the beneficiated the East Georgia Crude responded only moderately to reductive bleach.

TABLE 1

EFFECT OF SELECTIVE FLOCCULATION ON REMOVAL OF IMPURITIES FROM EAST GEORGIA KAOLIN

|  | GEB | $TiO_2$, wt. % | $Fe_2O_3$, wt. % | Recovery, wt. % clay* |
|---|---|---|---|---|
| DEGRITTED CRUDE | 80.0 | 3.94 | 0.92 | — |
| Example 1 | 90.4 | 0.64 | 0.92 | 73 |
| Example 2 | 89.0 | — | — | 82.0 |
| Example 2a | 89.9 | — | — | — |

*Based on weight of degritted crude.

EXAMPLE 3

A test was performed to study the effect of lower molecular weight of the flocculant on the selective flocculation process. The approximate molecular weight of the polymer used in this example is specified by the supplier is to be 5 MM.

East Georgia crude was blunged at 60% solids with 7 lb/ton of anhydrous sodium metasilicate and 0.5 lb/ton of C211 sodium polyacrylate using a Cowles mixer. This slurry was mixed for 15 minutes to ensure complete make down of the crude clay. This slurry was screened through a 200 mesh screen to remove the coarse grit material. In previous examples, a 325 mesh screen was used. A much coarser screen was employed in this example because of the ease in screening the slurry through a 200 mesh screen. The resulting slurry was then diluted to 40% solids. pH of the slurry was 10.5. To this slurry, 3 lb/ton of oleic acid and 2 lb/ton of calcium chloride solution (2 lb./ton expressed on a dry weight basis) were added simultaneously while mixing the slurry. The resulting slurry was mixed thoroughly for 3 minutes and diluted to 30% solids. To this slurry, 0.30 lb/ton of Sharpfloc™ 9954 polymer was added under mild agitation. The required amount of polymer, before addition, was diluted to a concentration such that when added to the clay slurry the resulting solids loading, was 20%. Dun colored flocs began to appear. As soon as the agitation was stopped, the flocs settled down. The flocs were very small compared to those observed in Examples 1 and 2. The decanted slurry was oven dried and analyzed.

Chemical analysis of the beneficiated slurry showed that the $TiO_2$ level of the East Georgia kaolin was reduced from about 4.0% to 1.54%. The GE brightness improved from 80.0% to 87.2% and the recovery of purified kaolin was 61%.

EXAMPLE 4

This test was performed to study the effect of another polymer on the selective flocculation process. The polymer used was supplied by Sharpe Specialty Chemical Company as Sharpfloc™ 8581 Polymer. This is a co-polymer of acrylamide and 2 acrylamide-2 methyl propyl sulfonic acid, sodium salt (poly AMPS). This polymer has 58% (by weight) anionic monomer in the co-polymer. The approximate molecular weight of the polymer as specified by the supplier is 15 MM.

Example 3 was repeated with Sharpfloc™ 8581 Polymer, as the flocculent. Dun colored flocs began to appear almost as soon as the flocculent was added. Once the agitation was stopped, the flocs settled down very rapidly. The flocs were very large. The flocs were oven dried and analyzed.

The results show that the $TiO_2$ level of the East Georgia kaolin was reduced from about 4.0% to 0.92%. The GE brightness improved from 80.0% to 89.4% and the recovery was 45%.

EXAMPLE 5

Tests were performed to study the effect of different salts on the selective flocculation process of the invention. The salts used were calcium chloride, calcium sulfate, sodium chloride and ammonium chloride.

Example 3 was repeated with the above mentioned different salts. Sharpfloc™ 9950 Polymer was used as the flocculent. Dun colored flocs began to appear almost as soon as the flocculent was added in case of the calcium salts. Once the agitation was stopped, the flocs settle down very rapidly.

The flocs were oven dried and analyzed. The results are shown in Table 2.

The results show that no separation was observed with a salt of a monovalent cation.

TABLE 2

EFFECT OF SALT TYPE ON SELECTIVE FLOCCULATION

| Salt used for Separation | $TiO_2$, wt. % | GEB Brightness | Recovery of Purified Kaolin, wt. %* |
|---|---|---|---|
| Calcium Chloride | 0.60 | 91.0 | 44 |
| Calcium Sulfate | 2.77 | 83.8 | 80 |
| Ammonium Chloride | 3.35 | 83.0 | 64 |
| Sodium Chloride | 3.17 | 83.0 | 82 |
| FEED | 3.54 | 81.8 | — |

*Based on weight of degritted crude.

EXAMPLE 6

This example illustrates the processing of the by-product from the selective flocculation process to prepare a dispersed dun-colored coating pigment. The flocculated layer from various tests similar to those described in Example 3 (using East Georgia crude) were collected, composited and analyzed. Analysis showed that the flocs were composed of coarse kaolin booklets and about 5.0% by weight $TiO_2$ (principally rutile). The flocs also contained oleic acid, calcium chloride and the anionic flocculating agent. The flocced material had a gel-like structure with a very high Brookfield viscosity (greater than 2000 cps) at 30% solids.

The flocs were redispersed (termed "primary redispersion") under mild agitation using 3 lb/ton of sodium polyacrylate (C211). This was followed by a degritting step involving, passing of the slurry through a 325 mesh (US Sieve) screen. This material was flocced with sulfuric acid to a pH of 3.5. This slurry was filtered. The filter cake was washed with a volume of water equivalent to the volume of the original slurry. The resulting filter cake was redispersed using a mixture of 3 lb/ton of soda ash and a 3 lb/ton of sodium polyacrylate (C211). A part of the slurry was spray dried to be added back to redispersed filter cake (in conventional manner) to build solids to 70%. This 70% solids slurry exhibited an excellent viscosity, demonstrating the ability of the flocculated material to redisperse. The particle size of the material after redispersion was 69.9% finer than 2 micrometers with an average particle size of 0.49 micrometers. The pigment had a brightness of 77.2%. Results are summarized in Table 3.

EXAMPLE 7

The primary redispersed material of Example 6 was flocced with sulfuric acid to a pH of 3.5. This material was bleached with 10 lb/ton of sodium hydrosulfate bleached and filtered. Similar processing steps as in Example 6 were then followed. Results in Table 3 show that this pigment had an excellent viscosity at 70% solids and the brightness was 79.8%. Brightness data in Table 3 indicates that the material exhibited a poor response to bleach.

EXAMPLE 8

This example illustrates the preparation of a delaminated pigment product by redispersion of a flocculated and delaminated by-product. A portion of the degritted slurry of Example 6 was delaminated using glass beads at roughly 30% solids to 89.1% finer than 2 micrometers. The average particle size was 0.34 micrometers. The slurry was subjected to the same processing as the pigment in Example 7. The brightness of the material was 81.4%. This delaminated pigment had an exceptionally good viscosity (see Table 3). Normally, delamination would be expected to negatively impact the viscosity, especially high shear viscosity. However with this pigment, the high shear viscosity was similar, if not better than that of the non-delaminated pigment.

TABLE 3

EFFECT OF PROCESSING STEPS ON PROPERTIES OF COLORED TITANIFEROUS COATING PIGMENT

| PIGMENT | GEB | BROOKFIELD, cps @ 20 RPM NO. 2 SPINDLE | HERCULES, DYNE, @ 4400 RPM USING "A" BOB |
|---|---|---|---|
| Example 6 | 77.2 | 165 | 12 |
| Example 7 | 79.8 | 180 | 10 |
| Example 8 | 81.4 | 250 | 9 |

While certain preferred practices and embodiments of the present invention have been set out and illustrated in the examples given herein, it will be understood that this invention may be otherwise practiced within the scope of the appended claims.

We claim:

1. A dun-colored pigment comprising a clay dispersant, particles of kaolin clay, 5–25% by weight titania, minor amounts of fatty acid and an anionic polymer, said pigment being 65–80% by weight finer than 2 micrometers and have an average particle size of 0.45 to 1.25 micrometers.

2. The pigment of claim 1 wherein booklets are present in said kaolin particles.

3. The pigment of claim 1 wherein said kaolin particles are delaminated.

4. The pigment of claim 1 which is formed into a 70% solids aqueous slurry that is fluid.

5. The pigment of claim 4 wherein a 70% solids aqueous slurry has a Brookfield viscosity in the range of 150–500 cps as measured with a No. 2 spindle at 20 rpm and a Hercules viscosity of 4–15 dynes as measured with an "A" bob at 4400 rpm.

6. Paper board containing as a base coat the pigment of claim 2.

7. Light weight paper coating containing the pigment of claim 3.

* * * * *